3,486,872
METHOD FOR PRODUCING A CRYSTALLIZED SINTERED GLASS ARTICLE WITH A NON-POROUS SURFACE
Gerald Edward Wojcik and William Manford Lawson, Toledo, Ohio, assignors to Owens-Illinois, Inc., a corporation of Ohio
No Drawing. Filed Nov. 15, 1966, Ser. No. 594,408
Int. Cl. C03b 29/00; C03c 3/22, 11/00
U.S. Cl. 65—33                                1 Claim

ABSTRACT OF THE DISCLOSURE

A crystallized sintered glass article having a non-porous surface and a method for forming the article. Crystallizable particulate glass that is crystallizable by in situ crystallization to a glass-ceramic is first arranged into a desired coherent but unfired shaped article. The article is then sintered to form a porous glass article which is then thermally crystallized at a temperature higher than that employed to effect the sintering. A porous glass-ceramic is thus formed having dispersed throughout a multitude of crystals of a plurality of crystalline species having a plurality of different melting points. The porous glass-ceramic article is then heated at a still higher temperature sufficient to melt a portion but not all of the crystals and form a non-porous surface on the glass-ceramic.

---

This invention relates in one aspect to a crystallized glass article in general and, in particular, to sintered crystallized glass compositions. In a further aspect, this invention relates to a method for making sintered glass-ceramic articles which have essentially non-porous surfaces and which possess other useful properties and characteristics.

Heretofore various processes have been developed for the heat treatment of thermally crystallizable vitreous compositions to form by way of controlled thermal in situ crystallization glass-ceramic (in situ crystallized glass) articles possessing increased mechanical strength and other improved properties over conventional glasses.

Finely divided thermally crystallizable glasses can be formed into a coherent mass of a desired shape and sintered to form an integral body, which is then subjected to a pre-determined heat treatment to convert the glass article to crystallized glass by thermal in situ crystallization without melting or deformation. However, such products exhibit a porosity which is undesirable for many uses.

Accordingly, it is an object of this invention to produce crystallized glass articles having improved properties and characteristics.

It is a further object of this invention to provide a new method for producing sintered glass-ceramic articles of improved properties and characteristics.

It is another object of this invention to provide a method for producing an essentially non-porous sintered glass article.

A still futher object of the present invention is to provide crystallized sintered glass articles having an essentially non-porous surface.

Other objects, features and advantages of the present invention will become apparent from the following detailed description thereof.

In attaining the above objects, one feature of the present invention resides in the controlled heat treatment of a porous crystallized sintered glass article whereby the article is subjected to a temperature in excess of the lowest temperature at which at least one crystalline species melts, thus at least partially melting at least one crystalline species without destroying the basic crystalline structure of the article and without undesired deformation of the article, and allowing the re-melted material to coalesce about the outer surface of said article to form a non-porous surface on cooling.

The method of the present invention comprises first arranging a mass of finely divided or particulate thermally crystallizable glass into any desired shape or form by pressing or the like, with or without a binder. This may be accomplished in a mold, for example. Thereafter, the finely divided glass composition so arranged is heated sufficiently to sinter the particles together to form a coherent but porous article of the desired shape or form. The sintered article is subjected to a predetermined heat treatment cycle involving heating to a temperature within the nucleation temperature range of the crystallizable glass and maintaining the article at a crystallization temperature range (usually higher than the nucleation temperature) until the glass is crystallized by in situ thermal crystallization to form a continuous skeletal network, the crystallized glass comprising a multiplicity of crystalline species having different melting temperatures. Thereafter, the article is heated to a temperature and for a time sufficient to at least partially melt at least one of the crystalline species, the temperature of heating being below the melting point of other crystalline species forming the skeletal network of the glass-ceramic. The re-melted crystalline species then coalesces on cooling and strengthens the article, and the melted material on the outer surface of said article on coalescing forms a non-porous surface.

Since it is difficult as well as unnecessary to determine precisely the melting temperature of each crystalline species, the method is practiced by heating the sintered mass until it is crystallized to a glass-ceramic by thermal in situ crystallization and then heating at such higher temperature that sufficient melting takes place to form a glazed non-porous surface, but without re-melting all of the crystals. This means that the final temperature of heating is below the liquidus of the starting material glass, i.e., the liquidus being the highest temperature at which crystals can form from a melt of the glass.

Thus, according to the invention a finely divided or particulate glass that is thermally crystallizable is sintered, heat treated to convert it to an at least partially crystalline porous ceramic having a multiplicity of different crystalline species of different melting points, and then is further heated to a higher temperature than in any previous step, the temperature of heating being above the melting point of some crystals but below the melting point of others (below the glass liquidus), thus forming a surface of a non-porous nature on cooling. If pressure is applied during this last heating, as in a mold, the entire article throughout can be made essentially non-porous.

The controlled thermal in situ crystallization of a glass article by means of a predetermined heat treatment is well known to produce a glass-ceramic product having increased mechanical strength due to the crystal structure consisting of small, randomly oriented crystals dispersed in a glassy matrix. Such glass-ceramic articles are usually made by thermal in situ crystallization of a completely non-porous, pre-formed glass object that has been formed by conventional glass pressing, blowing, casting, or one of the other many normal ways of forming glass articles from the melt. Such crystallized articles made this way are naturally already non-porous.

However, it is sometimes more economical by sintering to form intricate shapes from a mass of particulate or finely divided glass, resort to high temperatures being unnecessary in the initial forming of the desired shape.

Molds are thus cheaper and other economies are realizable.

Moreover, forming glass shapes from powdered glass by dry pressing or slip casting, followed by sintering, permits the making of shapes which cannot be formed readily by conventional methods of glass manufacture. This applies particularly to articles with holes. Further, powdered glass molded articles can be made to a much closer size tolerance than is obtainable for conventional glassware. See Kohl, "Materials and Techniques for Electron Tubes," Reinhold (1960), pp. 70–71.

In making essentially non-porous sintered glass articles from ordinary glass, the pressed or cast shape is sintered at a temperature slightly above the softening point of the glass. Because of the inherent properties of thermally crystallizable glass, this method cannot be used to make essentially non-porous glass articles from the powdered thermally crystallizable glass starting material. If an unfired glass shape made from a powder of such a glass is rapidly heated to about its softening point temperature, it will be improperly nucleated and, while sintering will take place to some degree, crystallization to undesirably large crystals (because of poor nucleation) will occur and the product will be weak. On the other hand, if the heating to about the softening point temperature of the original powdered glass shape is effected slowly so that nucleation and then later crystallization is effected, much crystallization takes place before the softening point temperature is reached. While a sintered article is produced it is extremely porous, because crystallization takes place on the way to reaching the softening point temperature of the original glass and a rigid skeletal network is formed. Thus, in effect, before the softening point temperature of the original glass is reached enough crystallization has been effected so that the "softening" point of the overall material is much higher than that of the original glass. The result is that the glass-ceramic article is highly porous and only lightly sintered and therefore weak. The present invention obviates these difficulties by adding a step of melting some of the lowest melting crystals in order to promote further sintering as well as the formation of a non-porous surface on the article.

The present process has general applicability to thermally crystallizable glasses from which glass-ceramics can be made by in situ thermal crystallization. For instance, the present process can be used with the thermally crystallizable glass compositions of the following patents and applications, whose compositions and teachings of suitable crystallization heat treatment schedules are incorporated herein by reference: U.S. Patent 3,117,881 (1964); U.S. Ser. No. 464,147, filed June 15, 1965 and Dutch patent application 6,509,945; U.S. Ser. No. 352,985, filed Mar. 18, 1964 now Patent No. 3,403,982 and Dutch patent application 6,503,460; U.S. Ser. No. 574,927, filed Aug. 23, 1966; U.S. Ser. No. 419,016, filed Nov. 9, 1964, now abandoned; U.S. Ser. No. 490,063, filed Sept. 24, 1965; French Patent 1,337,180 (1963); French Patent 1,300,614; British Patent 1,010,513 (1965); U.S. Patent 3,2,82,712 (1966); U.S. Patent 3,279,931 (1966); U.S. Patent 3,252,811 (1966); U.S. Patent 3,231,399 (1966); U.S. Patent 3,201,266 (1965); U.S. Patent 3,157,522 (1964).

When a glass-ceramic is made by thermal crystallization from the original glass, the crystals are formed in situ from a solid glass and as more and more crystals are formed, the later crystals are formed from a glass of different composition than the original glass. Thus, during the crystallization process the composition of the glass matrix is constantly changing and it has been found, as a consequence, that the composition of the crystals is also constantly changing. Thus, in a glass-ceramic made up mainly of beta-spodumene-type crystals, the beta-spodumene crystals are solid solutions of varying composition. While all the beta-spodumene crystals are of the same general type, they are of progressively different oxide compositions and have progressively different melting points. Also, in almost all glass-ceramics more than one distinct type of crystal is formed. For instance, see the Henry and Smith Patent No. 3,117,881 (1964).

The present invention takes advantage of the fact that a glass-ceramic made by thermal in situ crystallization contains crystals having different melting points, so that it is possible in the final heat treatment step of the present process to selectively melt crystals having the lowest melting points without melting the bulk of the crystals present. An essentially non-porous article of great strength can thus be produced.

In carrying out the process of the present invention, thermally crystallizable glass in particulate form is compacted in any of the normal ways that glass powders or crystalline oxide powders are shaped preparatory to preparation of an article from such materials by sintering methods. Usually some pressure is applied, as by compacting in a mold or die to make the desired shape. The compacted shape can be removed from the mold and other shaping be effected as by drilling or punching holes, machining with a sharp tool to remove exterior portions of the shape, etc. While it is not always necessary, as in the forming of simple shapes merely by pressing in a mold, the glass particles are usually coated with a binder according to normal practice before forming into the desired shape, so that the unfired shape will have sufficient strength for handling until it has been sintered. Various conventional binders can be used, and it is often desirable to employ volatilizable binders, but binders that volatilize only after thermal decomposition and/or combustion are also applicable in the normal way.

If the green, unsintered article does contain a binder, it is removed by a preliminary heat treatment below the temperature employed for sintering. The article or shape is then heat treated according to a predetermined heat treatment cycle. In the first stage of the heat treatment after removal of any binder, heating is effected at a temperature above the annealing point of the original glass to effect sintering of the glass into a coherent shape. This temperature is usually from about 50° F. to about 250° F. above the annealing point of the glass, for instance. However, if considerable pressure is applied during sintering or if extremely long times are used, sintering temperatures as low as the annealing point can be used. The annealing point temperature can be determined by ASTM Designation C336-54T, with the testing apparatus being calibrated using fibers of standard glasses having known annealing and strain points as specified and published by the National Bureau of Standards. The annealing point temperature corresponds to a glass viscosity of about $10^{13.5}$ poises.

The initial heat treatment step in the overall crystallization heat treatment of a thermally crystallizable glass is a relatively low temperature heat treatment usually called the "nucleation" step. Thus, the glass is first heated at a low temperature to form many nuclei or crystallites, and thereafter at a higher temperature to complete crystallization to the desired degree. As will be understood the optimum heat treatment scheduled depends on the particular thermally crystallizable glass composition, the rate at which nuclei inherently form at various temperatures in such glass, the rate of crystallization or crystal growth at various temperatures inherent for the particular glass, and further, the final properties of the crystallized glass which are desired. It is therefore obviously not possible to specify a crystallization heat treatment schedule that will be common to all thermally crystallizable glasses. However, it is usually preferred that the first-mentioned low temperature heat treatment be in the region of maximum or high rate of nuclei or crystallite formation, wherein "nuclei" are defined as submicroscopic precursors of crystalline species or as a finely divided dispersed submicroscopic immiscible glassy phase. In any event, the prior art is replete with instructions for crystallization heat treatment for the various thermally crystallizable glasses, including directions for optimum times and temperatures at which nucleation can be effected, as well as optimum times and temperatures at higher temperatures for the crystallization or crystal growth step.

Usually however, the nucleation heat treatment can be effected in the range from about 50° F. below the annealing point to about 250° F. above the annealing point of the thermally crystallizable glass. It will be noted that such temperatures are within the general range suitable for sintering the glass. Thus the sintering of the glass and its nucleation usually take place in large part simultaneously.

In any event, after the glass has been sintered to form a coherent body it is given further heat treatment in the same temperature range or in a somewhat higher temperature range to effect nucleation or more thorough nucleation if this is necessary. The glass is thereafter gradually heated up to a higher temperature range for the crystallization step, and the crystallization or crystal growth of the glass is effected. After crystallization the glass-ceramic, porous throughout, is heated to a higher temperature sufficient to melt a portion of the crystals until the surface at least has become non-porous. At the same time, the internal structure of the article is strengthened by the remelting of a portion of the crystals. In other words, the melted material promotes a further "sintering," which effects a further strengthening of the article.

The other common method of making sintered glass articles is to make a liquid slip of the powdered glass which is put into a plaster of Paris mold which absorbs the water from the slip. The casting is removed from the mold and is further dried before firing. These methods are common and are referred to, for instance, on pages 181 and 359 of Shand, "Glass Engineering Handbook," McGraw-Hill (1958). The slip casting method of forming the initial or green casting or shape is also applicable in the present process.

Usually, the proper temperature for the final firing step can be determined by a gross visual examination of the product. Thus, when the exterior of the article becomes glazed and essentially non-porous, but the article does not deform, some but not all of the crystals have been remelted. A few trials at slightly different times and temperatures will aid in determining the optimum time-temperature cycle for the final firing to obtain the greatest strength with a non-porous surface. However, it is also possible by X-ray powder diffraction methods to examine control samples heat treated in exactly the same way as the products being produced. Samples both before and after the final melting heat treating step can be examined to determine whether there is less crystalline material after the final step.

In the following examples of the invention, which are exemplary and are not to be taken as limiting, a thermally crystallizable glass was used having the following weight percent composition:

TABLE I

| Component: | Weight percent |
|---|---|
| $SiO_2$ | 68.9 |
| $Al_2O_3$ | 16.4 |
| $Li_2O$ | 2.7 |
| MgO | 5 |
| BaO | 2.7 |
| $TiO_2$ | 1.5 |
| $ZrO_2$ | 1.5 |
| F | 0.1 |
| $P_2O_5$ | 0.6 |
| $As_2O_3$ | 0.2 |
| $Na_2O$ | 0.4 |

The glass was made in the usual manner by melting particulate batch materials in the proper proportions, using a glass temperature of about 2900° F. and a melting time of about three days in a high alumina refractory (Monofrax M) gas-fired tank furnace, using a slight excess of air for an oxidizing atmosphere. The batch materials used were petalite,[1] flint,[2] alumina,[3] periclase,[4] zircon,[5] Titanox $TiO_2$,[6] aluminum metaphosphate,[7] lithium fluoride,[8] arsenic trioxide and barium carbonate. The glass was ground to a No. 8 mesh particle size and then magnetically filtered. The filtered glass was then pebble milled for 200 minutes and screened through a No. 100 mesh screen. A binder of polyethylene glycol (Carbowax) in acetone (3% by weight) was added to the glass which had been preheated to 160° F. Preheating of the glass was to ensure a uniform coating by the binder.

The coated glass was heated at 120° F. until all traces of acetone were removed and the Carbowax coated glass was dry.

The glass was pressed at 5000 p.s.i.g. to obtain the desired shape, which was then baked at 900° F. for 45 minutes to eliminate the Carbowax prior to sintering heat treatment. The samples pressed were rectangular bars 5 inches long, 5/32 inch high and 1/8 inch wide.

The bars were given crystallization heat treatments and a post firing to remelt a portion of the crystals according to the invention. Table II shows the rod strengths which are the average strengths of a number of rods in each sample group number. The glass-ceramic rods were porous and relatively weak before the final post firing; after firing the surfaces of the glass-ceramic rods were non-porous. They withstood thermal shock without fracturing on plunging into room temperature water when heated to 1000° F. Table III shows the crystallization heat treatment cycles received by each sample group and referred to in the second column of Table II.

TABLE II

| Sample group No. | Heat treating cycle | Post firing cycle ° F.-minutes | Rod strength,* p.s.i./100 |
|---|---|---|---|
| 1 | 1 | 2,100–75 | 78 |
| 2 | 1 | 2,150–30 | 81 |
| 3 | 1 | 2,125–60 | 75 |
| 4 | 2 | 2,100–105 | 74 |
| 5 | 3 | 2,100–105 | 78 |

*Modulus of rupture on rod samples lightly abraded with 150 grit carborundum cloth

TABLE III

| No. 1 | No. 2 | No. 3 |
|---|---|---|
| 1,350° F.-60' | 1,300° F.-60' | 1,200° F.-60' |
| 1,450° F.-120' | 1,400° F.-180' | 1,450° F.-180' |
| 1,950° F.-60' | 1,950° F.-60' | 1,950° F.-60' |

Another group of the test rods was sintered and nucleated by heating for 180 minutes at 1350° F. The rods were then further heated for crystallization and final crystal melting to develop a non-porous surface by holding at 1450° F. for 120 minutes, then gradually heating up to 2100° F. and holding there for 105 minutes. Part of the crystals previously formed at the higher temperatures were remelted on heating at the 2100° F. temperature. These rods, abraded as before, had a modulus of rupture of 9100 p.s.i., were non-porous on the surface, and withstood thermal shock without fracture on plunging from 1200° F. into room temperature water.

The method of the invention is useful for making various ceramic articles, such as side rods, insulators, plates for sealing electrical conduits, and tableware such as cups and saucers and tubing for making graded seals between

---

[1] 4.2% $Li_2O$, 16.2% $Al_2O_3$, 77.7% $SiO_2$, 0.4% $Na_2O$, 0.2% $K_2O$ and 0.027% $Fe_2O_3$, and other minor impurities, including 1% ignition loss.
[2] 99.9+% $SiO_2$.
[3] 99.5% $Al_2O_3$, 0.03% $Fe_2O_3$, 0.1% $Na_2O$, 0.08% $SiO_2$, 0.2+% ignition loss.
[4] 95.3% MgO, 0.5% $Fe_2O_3$, 2.8% $SiO_2$, 0.3% $Al_2O_3$, 1.1% CaO.
[5] 66% $ZrO_2$, 33.5% $SiO_2$, 0.25% $TiO_2$, 0.1% $FeO_3$.
[6] Substantially pure $TiO_2$.
[7] Substantially pure, except about 1% ignition loss.
[8] Essentially pure LiF.

parts of different expansion coefficients. Thus, short lengths of tubing can be pressed from glasses of different expansion coefficients (in the crystallized state) and these sealed together serially during the sintering process, then processed as herein described to make the graded sealing tubing.

We claim:

1. A method of forming a crystallized glass article having a glazed non-porous surface which comprises (1) forming particulate glass that is crystallizable by situ crystallization to a glass-ceramic, into a desired coherent but unfired shaped article, (2) sintering said article and forming a sintered porous glass article, (3) thermally crystallizing said glass article at a temperature sufficient to effect said crystallization of said article, said temperature being higher than that employed to effect said sintering and thereby forming a porous glass-ceramic having dispersed throughout a multitude of crystals of a plurality of crystalline species having a plurality of different melting points, and (4) heating said porous glass-ceramic at a still higher temperature sufficient to melt a portion but not all of said crystals and thereby forming a glazed non-porous surface on said glass-ceramic.

References Cited

UNITED STATES PATENTS

| | | | |
|---|---|---|---|
| 2,270,718 | 1/1942 | Skaupy et al. | 65—33 |
| 3,170,812 | 2/1965 | Schwartz | 65—33 XR |
| 3,265,478 | 8/1966 | Slayter | 65—33 XR |
| 3,365,314 | 1/1968 | Sack | 65—18 XR |

S. LEON BASHORE, Primary Examiner

J. H. HARMAN, Assistant Examiner

U.S. Cl. X.R.

65—18; 106—39